United States Patent
Zuchowski

(10) Patent No.: US 6,483,643 B1
(45) Date of Patent: Nov. 19, 2002

(54) CONTROLLED GAIN PROJECTION SCREEN

(76) Inventor: Larry Zuchowski, 5221 Bellingham Apt. 102, Northridge, CA (US) 91607

( * ) Notice: Subject to any disclaimer, the term of this patent is extended or adjusted under 35 U.S.C. 154(b) by 0 days.

(21) Appl. No.: 09/285,900

(22) Filed: Apr. 8, 1999

(51) Int. Cl.$^7$ .................. G03B 21/56; G03B 21/60
(52) U.S. Cl. .................. 359/443; 359/452; 359/460
(58) Field of Search .................. 359/443, 452, 359/453, 454, 455, 456, 458, 460; 349/112, 113; 348/383, 511

(56) References Cited

U.S. PATENT DOCUMENTS

| | | | | |
|---|---|---|---|---|
| 4,405,211 A | * | 9/1983 | Harrison et al. | 350/349 |
| 5,075,789 A | * | 12/1991 | Jones et al. | 357/40 |
| 5,136,390 A | * | 8/1992 | Inova et al. | 358/231 |
| 5,193,015 A | * | 3/1993 | Shanks | 359/53 |
| 5,416,617 A | * | 5/1995 | Loiseaux et al. | 359/51 |
| 5,504,598 A | * | 4/1996 | Sprague et al. | 359/41 |
| 5,708,528 A | * | 1/1998 | Furuya | 359/457 |
| 5,838,289 A | * | 11/1998 | Saito et al. | 345/79 |
| 5,903,328 A | * | 5/1999 | Greene et al. | 349/73 |
| 5,956,000 A | * | 9/1999 | Kreitman et al. | 345/1 |

* cited by examiner

*Primary Examiner*—Christopher Mahoney
(74) *Attorney, Agent, or Firm*—Renner, Otto, Boisselle & Sklar, LLP

(57) ABSTRACT

Light scatter control is provided in rear projection and front projection of light images focused upon a screen having a liquid crystal droplet film, and modulated light gain control of single and multi panel screens is provided, without size restriction, maximizing light transmission and reflection, for brilliant high resolution viewing of cinema and video regardless of high degree of ambient light. Panels of liquid crystal film lamina and associated laminates are joined by imperceptible optical splicing.

43 Claims, 6 Drawing Sheets

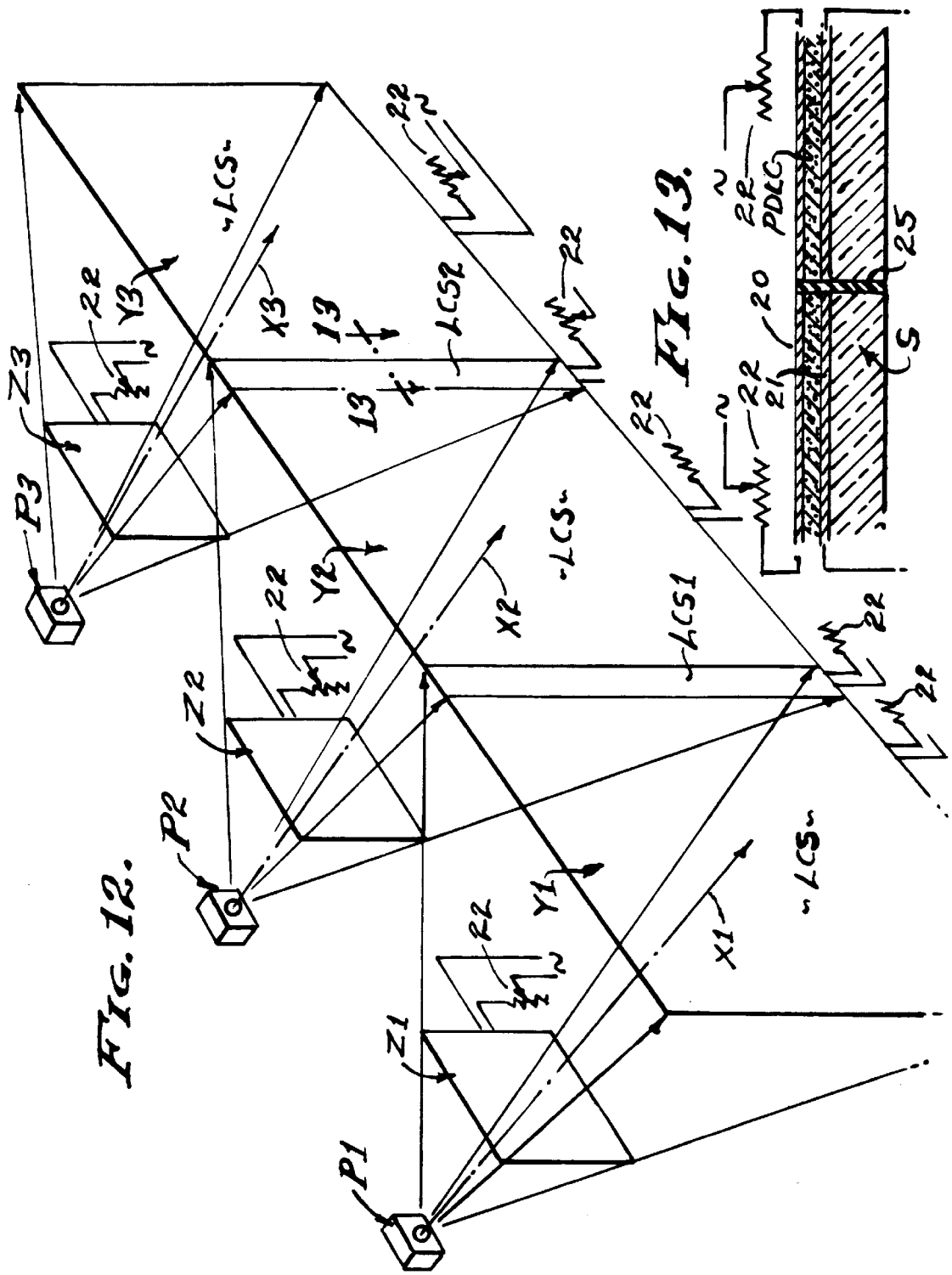

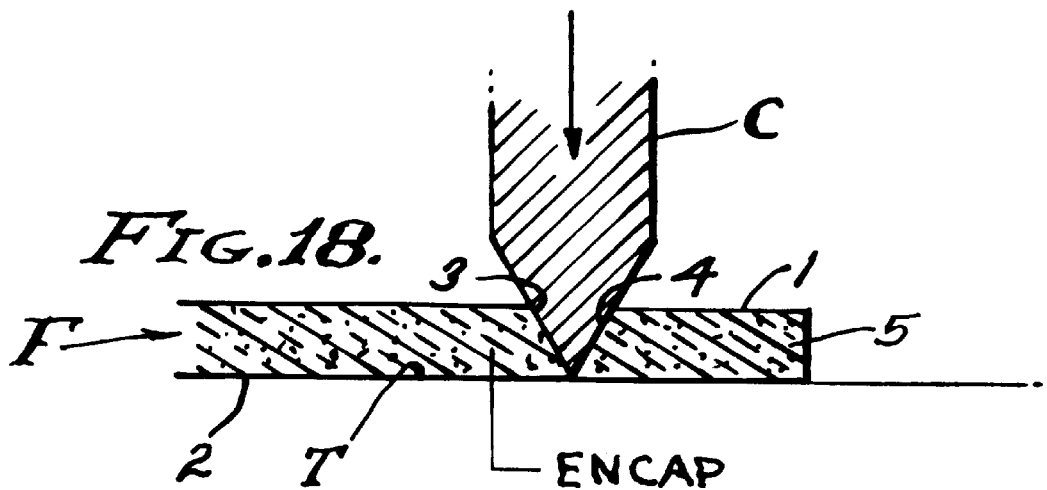
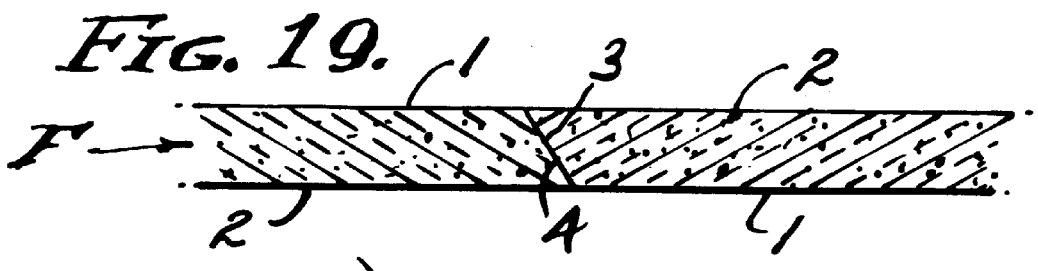
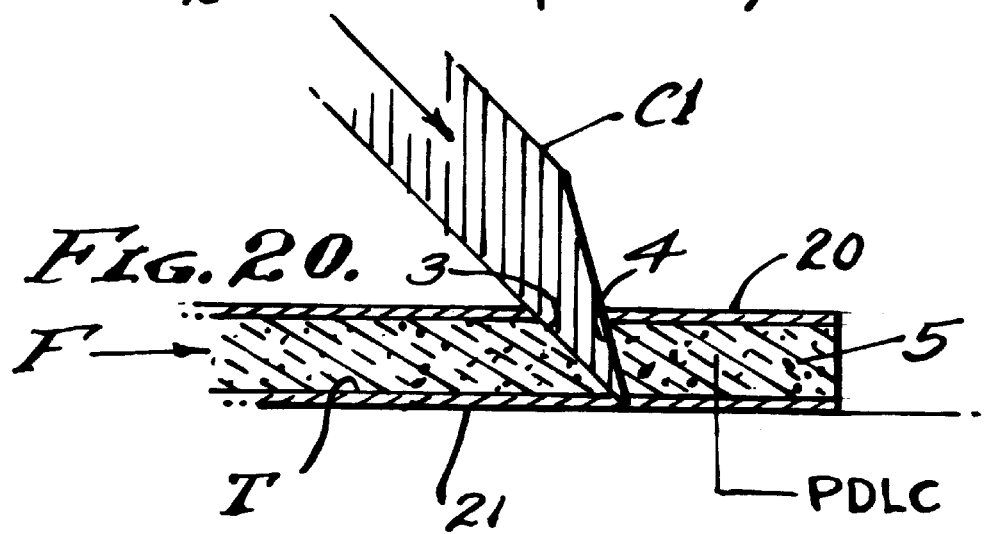
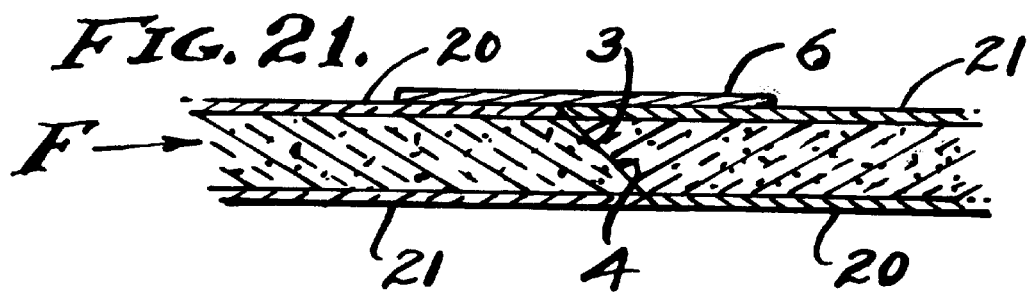

CONTROLLED GAIN PROJECTION SCREEN

BACKGROUND OF THE INVENTION

This invention relates to viewing screens upon or through which images are projected, it being a general object of this invention to efficiently control and maximize light emission or "gain", especially from large screen areas. More particularly, it is an object here to provide a variable gain viewing screen for either rear or front projection, and a screen that can be implemented without restriction to size and shape.

The basic prior art projection screen is a planar matte or flat-white surface onto which an image is projected with white light, and which requires a darkened area, room or auditorium, whereby the dark parts of the image are formed by the absence of light. And, the darker the room, the greater is the contrast. Since total darkness is difficult to obtain, particularly in theaters, the famous "silver screen" of Hollywood's heyday was devised in order to increase reflective "gain", which increased light emission and contrast from the screen, thereby producing better black. However, as the ambient light increases in the theater, the screen image washes out.

The white or silver screen was then improved by adding minute glass beads to the reflective surface of the screen, which improved gain or light reflection efficiency by two to ten times that of a matte or flat-white screen. But unfortunately, the glass beads give the reflected image a "grainy" soft focus effect, the adhesive used to hold the beads oxidizes and yellows the screen, and the beads fall off of the screen, whereupon the gain deteriorates and the screen becomes more and more dependent upon room darkness.

An improvement over the "silver screen" is the "lenticular screen" having a vertically disposed corrugated reflective surface for the purpose of horizontally expanding the reflected "cone of light", and silvered so as to improve image contrast when ambient light increases. The "gain" of lenticular screens is approximately two to four times that of a matte or flat-white screen. The lenticular screen produces a fairly good image even in a room with ambient light sufficient to wash out the image from a white or beaded screen, in spite of its lower gain factor which requires a higher wattage projector. However, the lenticular screen has several defects in addition to the requirement of higher projection wattage, there being visible vertical lines coextensive of the screen reducing image sharpness, and that the screen must be maintained substantially flat and cannot be overly bent and/or successfully rolled.

State of the art full color image projection recognizes that a flat white surface produces the sharpest image (definition), that a highly reflective surface efficiently returns reflected light (contrast), that a beaded effect expands the cone of reflected light (displaced observation), and that a lenticular effect expands the cone of reflected light in the horizontal plane for viewing from side to side of the theater but not so in the vertical plane (efficiency). Therefore, it is an object of the present invention to increase and control screen light emission or "gain", to maximize focus as well as contrast for image and color definition and brightness, to provide a wide "cone effect" for horizontal as well as vertical displacement of observation, and to thereby obviate the deficiencies of prior art screens.

An object of this invention is to provide a basic high-gain viewing screen for image projection characterized by a thin film containing liquid crystal material having a light scattering function and applied as a layer on or encapsulated in a planar substrate of transparent material onto which a light image is focused and diffused therefrom in wide angled cones for front viewing rear image projection.

Another object of this invention is to provide a controllable high-gain screen for image projection characterized by a thin film containing liquid crystal material having a light scattering function in an electrically unenergized state so as to be opaque or translucent, and by a light transmitting function in an electrically energized state so as to be more or less translucent and/or transparent, and applied as a layer on or encapsulated in a planar substrate of transparent material onto which a light image is focused and diffused therethrough to emanate in wide angled cones for viewing rear image projection. In practice, "micro encapsulated" liquid crystal is employed, made as by encapsulating liquid crystal droplets within a thin polymer to form cells which are then introduced into a matrix having light scattering properties similar to Polymer Dispersal Liquid Crystal (PDLC) which is responsive to electric fields, or Encapsulated (ENCAP).

An object of this invention is to provide a basic high-gain front viewing screen for image projection and characterized by a thin film of liquid crystal material having a light scattering function and applied as a layer on or encapsulated in a planar substrate of transparent material onto which a light image is focused and refracted through a front side thereof, there being a light reflective surface contiguous to a back side of said substrate for forward reflection of the image diffused through and from the substrate in wide angled cones for front viewing of the projected image.

Another object of this invention is to provide a controllable high-gain front viewing screen for image projection and characterized by a thin film containing liquid crystal material having a light scattering function in an electrically unenergized state so as to be opaque or translucent, and by a light transmitting function in an electrically energized state so as to be more or less translucent and/or transparent, and applied as a layer on or encapsulated in a planar substrate of transparent material onto which a light image is focused and refracted through a front side thereof, there being a light reflective surface contiguous to a back side of said substrate for forward reflection of the image diffused by diffraction through and from the substrate in widened angles for front viewing. In practice, a PDLC material is employed and by means of its nematic director has light scattering properties responsive to electrical potential for controlling orientational order and diffusion by diffraction of light therethrough in widened angles for front viewing the projected image.

It is still another object of this invention to provide a high-gain Liquid Crystal Screen hereinafter referred to as an "LCS", an image viewing screen characterized by a laminaform structure, preferably comprised of a polymer substrate including functional laminations/that implement the basic structure herein disclosed, and including the Liquid Crystal Screen (LCS) coating or lamina, transparent protective coatings or lamina, transparent electrically conductive coatings or lamina, reflective coatings or lamina, and adhesive coatings or lamina, all as may be required and as hereinafter described.

An object of this invention is to provide a unique projection screen material for use in both front and rear image projection, with high-gain image viewing, and controlled light scattering and contrast properties adjusted by film thickness, droplet size, and/or electrically to optimize viewing under ambient light conditions. In practice, the screen is a liquid crustal encapsulated in a clear substrate.

An object of this invention is to overcome the present size limitations that restrict construction of high-gain screens in theaters, by splicing and optically coupling sheet-screen segments into larger sized screens devoid of visible segment joinder, at normal viewing distances.

An object of this invention is to accomodate a plurality of image projectors electronic, video or film projectors, for projecting high resolution images on or through enlarged screens, for example large elongated theater screens. In carrying out this invention, the Liquid Crystal Screen (LCS) is segmentally zoned and each is electronically addressed to adjust light gain levels that correct the brightness factors of overlapping image projection. In practice, multiple projectors for optically composite imagry are arranged at perspective angles and with variable intensity light projection for creating screening that has and all of which is optically blended by electronic control.

An object of this invention is the provision of special effects capability, as by the reflection or transmission of secondary imagry with laser light fired through or reflected from the screen, dependent upon its embodiment as a rear or front projection screen, thereby creating special effects that are added to the primary image projection.

Heretofore, liquid crystals have been addressed electrically in order to form images and switchable light panels (windows). A common example is the Liquid Crystal Display (LCD) with its seven segment characters for presenting numerals 1–0. The LCD is characterized by liquid crystal cells layered between transparent electrode laminae, and all of which is laminated between top and bottom transparent plates. And an additional reflective lamina is used only if the LCD is to be used in the reflective mode. Characteristically, the imagry or display is generated within the laminate structure and not imposed thereon from an external source. The principle of such panels is to obscure light by preventing transmission therethrough, and reversely to clear the panel. Previous attempts in projecting light through or reflecting from liquid crystal screens have been unsuccessful because of a "hot spot" on the projection axis of the screen. This invention corrects this by adjusting light scatter with the selection of liquid crystal material and the film thickness thereof.

SUMMARY OF THE INVENTION

This Liquid Crystal Screen (LCS) is embodied in either a rear or a front projection configuration and the surface upon which an image is focused is either planar, or arcuate as may be required (single or compound curvature). The screen per se is essentially a laminate comprised of a structural substrate which can be rigid such as a panel of glass, or it can be flexible such as a sheet of polymer material. In practice, the screen is fabricated singularly or of coplanar segments of substrate abutted edge to edge and positioned for viewing by means of a frame or planar support as circumstances require. Or contiguously secured to a concaved (or spherical) wall, such as in a typical wide screen theater installation.

Novelty resides in a means by which projected light is diffracted so as to be diffused and emanate in relatively widened angles for viewing of imaging focused upon the screen surface (front or rear), said means being comprised of a coating or lamina, or encapsulation of minute nematic liquid crystals for controlled projected light diffracted therethrough.

In the basic rear projection embodiment, the projected light is partially blocked by a nematic phase of the liquid crystal which renders the lamina thereof translucent and thereby scattering a portion of said light by diffraction so as to be diffused when emanating forwardly from the screen in relatively widened angles for viewing. Light emission gain is determined and fixed by the translucency dependent upon the set condition of the liquid crystal nematic director.

A feature is control of screen translucency by means of variable electrical potential applied to the director of the liquid crystal cells throughout a range of opaqueness to transparency. Accordingly, in an unenergized condition the nematic phase of the liquid crystal is characterized by having the long axes of its molecules in parallel lines but not in layers, with the liquid crystals at random in light scattering positions. However, in the energized condition the liquid crystals are orientationally ordered with molecules arranged perpendicular to the plane of the cells and with the liquid crystal crystals aligned more or less in a "clear" light transmitting condition. The degree of translucency or transparency is dependent upon the strength of the electrical potential applied above an operational threshold.

Another feature is the front projection embodiment having the aforesaid advantageous features of the basic Liquid Crystal Screen (LCS) and electrical gain control, and which includes a reflective surface contiguous to the back side of the LCS substrate. In practice, a first surface laminaform mirror is contiguously fixed to the back side of the transparent liquid crystal carrying substrate for efficient return of light and diffraction for viewing as thus far described.

A feature is the minuscule configuration of the liquid crystal, the size and density of which is selectively controlled for high resolution, and that diffracts the light for the scattering effect and desired forward diffusion of wide angle image projection to the viewer.

This LCS projector screen is a laminate structured about a flexible dimensionally stable transparent substrate, and comprised of a plurality of lamina and each having a function related to light and electrical conductivity for variably controlling light gain and forward conical projection in either of two modes, rear projection and front projection.

The foregoing and various other objects and features of this invention will be apparent and fully understood from the following detailed description of the typical preferred forms and applications thereof, throughout which description reference is made to the accompanying drawings.

THE DRAWINGS

FIG. 12 is a diagrammatic perspective view of multi axis image projection and addressing of individual screen panels and spacial modulators, and FIG. 13 is an enlarged fragmentary sectional view taken as indicated by line 13—13 on FIG. 12.

FIG. 18 is an enlarged fragmentary sectional view illustrating the cutting and forming of the optical splice which characterizes this LCS screen, and FIG. 19 is a similar view showing the completed optical splice.

FIG. 20 is an enlarged fragmentary sectional view illustrating the shearing of a laminate for the optical splice of this LCS screen, and FIG. 21 is a similar view showing the completed optical splice.

PREFERRED EMBODIMENT

Figure 1:
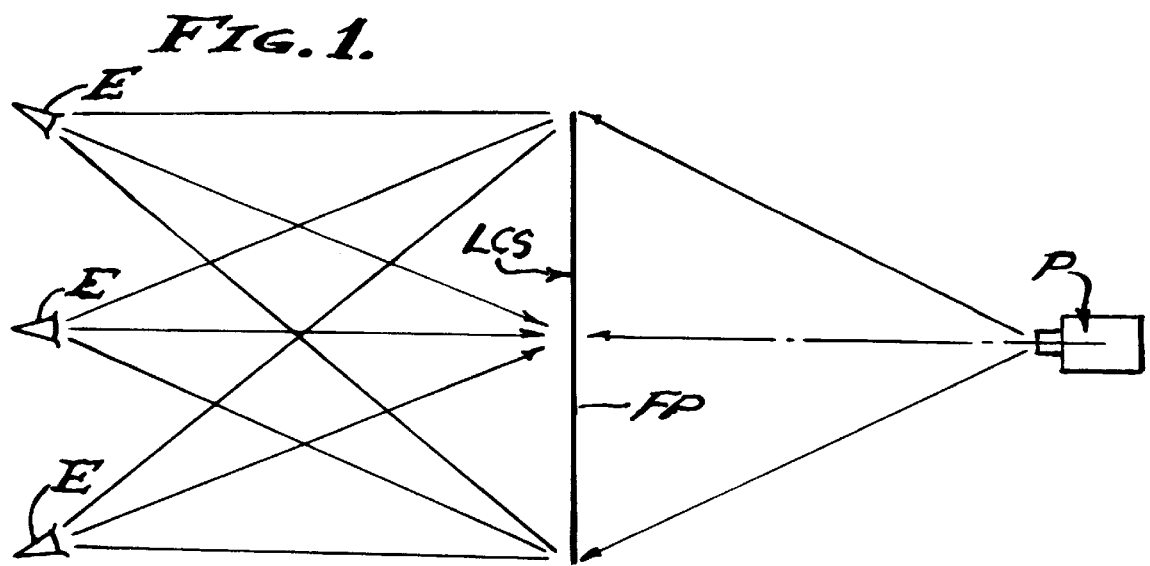
FIG. 1 is a diagrammatic view of rear projection imaging through a Liquid Crystal Screen according to the present invention.
Figure 6:
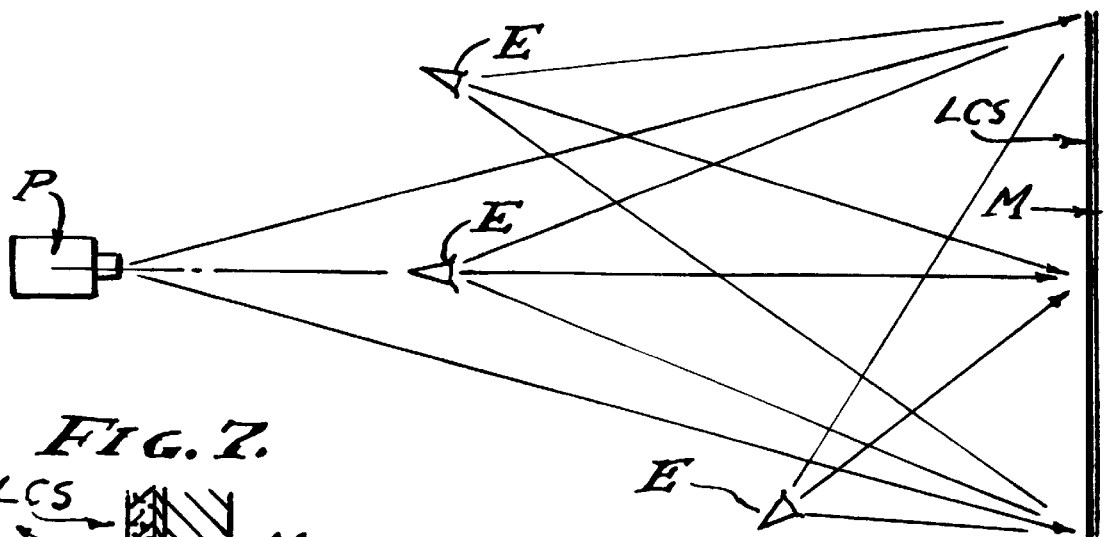
FIG. 6 is a diagrammatic view of front projection imaging upon a Liquid Crystal Screen according to the present invention.

Referring now to the drawings, three basic image projection embodiments are shown, FIG. 1 illustrating a fundamental rear projection system, FIG. 6 illustrating a front projection system, and FIG. 12 illustrating a multi-axis projection system. Each of these systems is characterized by at least one imaging projector P that focuses an image upon a Liquid Crystal Screen (LCS) for viewing in darkened as well as ambient light conditions. The imaging projector P can be any light projecting system such as state of the art cinema or video projection that produces black and white or color images. Subdued room lighting is preferred, however the LCS herein disclosed is such as to transmit or reflect a high percentage of projected light, referred to as "high-gain", by using highly efficient light transmitting materials with moderate light scattering for spreading the viewing image laterally to the audience. Accordingly, control is such that very little light is lost nor wasted, resulting in a brighter image that overcomes the adverse effect of ambient room lighting.

The basic concept is disclosed in FIG. 1, embodied in a rear projection system wherein a Liquid Crystal Screen (LCS) is disposed between an image light projector P and the eyes E of a viewing audience or the like. As shown, there is a single projector P with a lens system focusing a light image upon a rear focal plane FP at the back of the screen LCS, and this is the sole source of imagry. And, it will be observed that there is a multiplicity of eye E vantage points facing the front of the screen LCS, for straight and lateral as well as vertical displaced viewing. In accordance with this invention, a nematic liquid crystal film is employed for scattering projected light by means of refraction thereby diffusing the projected light emanating forwardly from the screen LCS. In practice, the screen material is translucent so as to be illuminated by the projected light to form an image for front viewing, the liquid crystal being selected as to material, molecule orientation, size and film thickness, in order to optimize light scatter by means of refraction within the liquid crystal. The eyes E focused upon the screen LCS from straight-on and laterally displaced positions are receptive to the scattered light emanating from the screen.

Figure 2:
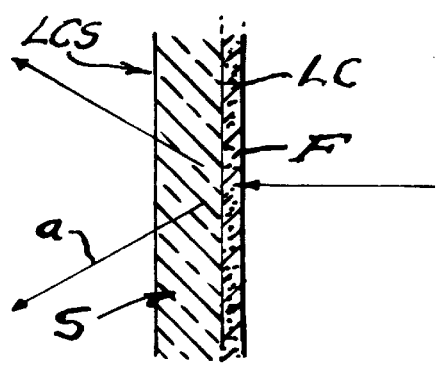
FIGS. 2 through 5 are enlarged fragmentary sectional views illustrating various cross sectional configurations of the LCS screen.

FIG. 2 implements the Liquid Crystal Screen LCS of FIG. 1 by employing a lamina or substrate in the form of a liquid crystal (LC) film F. A property of liquid crystal material is that it is more liquid than solid, and not having a fixed molecular structure it must be contained or supported. Also in practice, the LC film F is very thin, for example approximately 25 microns thick, and for support a substantially thick substrate S is provided such as glass or preferably a clear polymer such as Milar as manufactured by DuPont. For example a substrate thickness of 0.030 inch or more is used, dependent upon the size of the screen.

A nematic phase of liquid crystal is employed herein, not to exclude the use of other liquid crustal phases, characterized by having the long axes of its molecules in parallel lines but not layers, from which a film is formed to efficiently scatter light. The liquid crystal director adopts one of two configurations, depending upon whether the liquid crystal prefers to align parallel or perpendicular to the plane of the film. In the case of parallel alignment, two points occur where the director is undefined (disclinations), while in the case of perpendicular alignment only one disclination occurs. Thus with parallel alignment as employed herein with no electric field or potential applied, two disclinations normally occur with the molecules oriented at random, which is conducive to scatter light.

Light polarized parallel to the director travels at one velocity in the liquid crystal and light polarized perpendicular to the director travels with a different velocity. Light traveling through the LCS film F has its electric field oriented parallel to the plane of the film so it must interact with the director parallel to the electric field, perpendicular to the electric field and at every angle therebetween. It is therefore impossible for the indices of refraction to be equal, so that the difference of indices causes reflections from the greater number of molecules. As a result, the LCS with no electric field or potential applied scatters light intensely. By carefully selecting and conditioning the LCS material, a fixed translucency and light scattering effect is attained. This controlled translucency has the effect of transmitting and diffusing light passing through the LCS.

In accordance with this invention, the projected light PL transmitted through the LCS film F is scattered by molecular refraction so as to be diffused and spread angularly as indicated by the arrows a.

Figure 3:
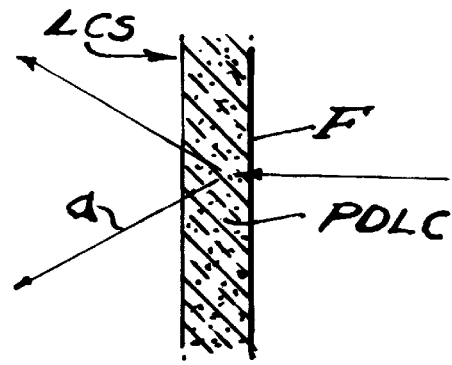

FIG. 3 implements the Liquid Crystal Screen LCS of FIG. 1 by incorporating the liquid crystal material in a lamina or substrate in the form of a liquid crystal film F, which may be a self supporting Encapsulated Liquid Crustal (ENCAP). Accordingly, a Polymer Dispersed Liquid Crystal (PDLC) is employed wherein the liquid crystal material is contained in the form of minuscule droplets or cells embedded in a polymer matrix (see FIGS. 14 and 15). In practice, a solid is formed by mixing a fluid polymer with a cross-linking agent, such as a two part epoxy (resin and hardener). A liquid crystal material is dissolved into the mixture while it is fluid, whereupon cross-linking chemical reactions force the liquid crystal material out of and to remain within the confines of the forming solid and in the form of spherical droplets or cells of liquid crystal. The droplets or cells are uniform and the size thereof controlled from 0.1 to 10 micrometers by adjusting the rate at which the cross-linking reaction takes place. Hardening between parallel surfaces establishes a PDLC lamina or film F.

As hereinabove described, the nematic phase of liquid crystal is employed whereby projected light PL transmitted through the PDLC film F is scattered by molecular refraction so as to be diffused and spread angularly as is indicated by the arrows a. A characteristic feature of the PDLC is the encapsulation of liquid crystal droplets or cells within the solid matrix lamina, film or substrate.

Figure 4:
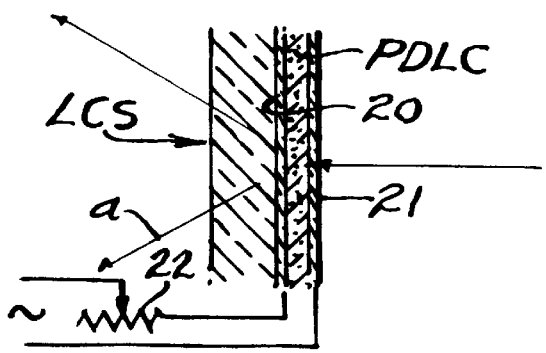

FIG. 4 implements the Liquid Crystal Screen LCS of FIG. 1 by electrically controlling the translucency of the liquid crystal film F. As hereinabove described with reference to the FIG. 3 embodiment, a thin ENCAP or Polymer Dispersed Liquid Crystal (PDLC) is employed for containment of the liquid crystal droplets or cells, supported here by a transparent substrate S and preferably such as a clear polymer ie. Milar. And, in accordance with this invention a magnetic or electric field is applied between the front and back faces of the liquid crystal film F coextensively thereof for controlled dipole alignment of the crystal molecules. In practice, opposed electrically conductive transparent lamina 20 and 21 of Indium Tin Oxide or the like are in contiguous surface contact with the front and back faces of the liquid crystal film F, respectively. Negative and positive variable field potential is applied through a potentiometer 22, for applying voltage up to and through an operational threshold in order to vary translucency of the film F.

As hereinabove described, in the case of parallel alignment of nematic liquid crystal two points occur where the director is undefined (disclinations), while in the case of perpendicular alignment only one disclination occurs. In parallel alignment when no electric field is applied, each droplet or cell is oriented with the line connecting the two disclinations and the moleclues oriented at random. And, light passing through the PDLC film has its electric field oriented parallel to the opposite faces of the film, so it must interact with the droplets or cells oriented with the director parallel to the electric field, perpendicular to the electric field and to every angle thereof between. Again, it is impossible for the indices of refraction to be equal, so that the difference of indices causes reflections from the droplets or cells. As a result, a PDLC with no electric field applied scatters light intensely.

However, when an electric field is increasingly applied as shown in FIG. 4, the ENCAP or PDLC film liquid crystal molecules increasingly align with the director disposition in each droplet or cell thereby connecting the two disclination lines parallel to the electrical field substantially perpendicular to the director (see FIG. 15), so that refraction is reduced and the PDLC film F appears less translucent, as the degree of field potential is applied. The degree of liquid crystal translucency is thereby controlled by the application of electrical potential applied between the lamina 20 and 21, and in alignment perpendicular to the front and back faces of the film F.

Figure 5:
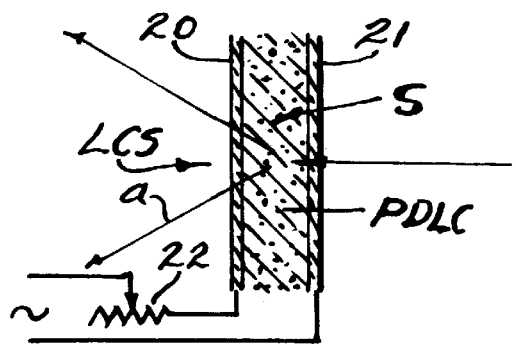

FIG. 5 implements the Liquid Crystal Screen LCS of FIG. 1 by electrically controlling the translucency of the liquid crystal film F. As hereinabove described with reference to the FIG. 3 embodiment, an ENCAP or Polymer Dispersed Liquid Crystal (PDLC) substrate S of clear polymer such as Milar is employed here for containment and support of the liquid crystal droplets or cells And as hereinabove described with reference to the FIG. 4 embodiment, a magnetic or electric field is applied between the front and back faces of the ENCAP or PDLC substrate by electrically conductive transparent lamina 20 and 21 of Indium Tin Oxide or the like in contiguous surface contact with the front and back faces of the substrate, respectively. And a variable field potential is applied through a potentiometer 22, as shown.

Referring now to FIG. 6 the theater concept is disclosed, embodied, in a front projection system wherein a Liquid Crystal Screen (LCS) faces both a light image projector P and the eyes E of a viewing audience. As shown, there is basically a cinema or video projector P with a lens system focusing a Light image upon a reflective focal plane in the form of a highly reflective mirror M, the cinema or video projector being the sole source of imagry. And, as it will be observed that there is a multiplicity of eye E vantage points facing the front of the screen LCS, for straight-on as well as for laterally displaced viewing. In accordance with this invention, a nematic liquid crystal film is employed for scattering projected light by means of refraction, thereby diffusing the projected as well as the reflected light emanating forwardly from the LCS. In practice, the screen construction is a substrate S that supports a light scattering liquid crystal film F backed by a reflector mirror lamina M. As before, the liquid crystal is selected as to material, molecule orientation, and size, in order to optimize light scatter by means of refraction within and through the liquid crystal. The eyes E focused upon the screen LCS from straight-on and laterally displaced positions are receptive to the scattered light emanating from the screen.

Figure 7:
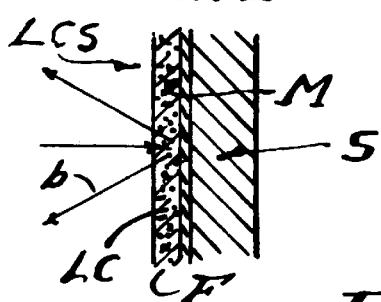
FIGS. 7 through 11 are enlarged fragmentary sectional views illustrating various cross sectional configurations of the reflective LCS screen.

FIG. 7 implements the Liquid Crystal Screen LCS and reflector M combination of FIG. 6 by employing a substrate S support carrying the liquid crystal film F. The liquid crystal material or film lamina F may be a self supporting encapsulated polymer ENCAP or PDLC as shown in FIG. 3 or backed by a reflective coating or lamina as shown in FIG. 7. Also in practice, the LCS polymer ENCAP or PDLC film F is very thin and for example a film thickness of 20–25 mills is used, dependent upon the size of the screen.

In accordance with this front projection system, the reflector M faces forwardly and is positioned with its reflective surface contiguous to the back face of the nematic film F. The reflector M is preferably a first surface mirror, such as an aluminized surface capable of 90% or more reflective efficiency. Alternatively, a sealed Silver surface can be employed. In practice an aluminized film such as "Silver Flux" TM as manufactured by 3M is used as shown. Therefore, projected light comprised of the image to be front viewed is transmitted rearwardly through the nematic film lamina F and subjected to molecular refraction, and is then reflected and transmitted forwardly through the nematic film lamina F and again subjected to molecular refraction. Accordingly, refraction is compounded so as to double the degree of light scatter effect, thereby increasing diffusion of light and its angular spread as indicated by the arrows b.

Figure 8:
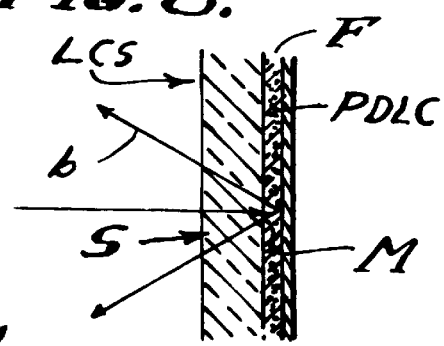

FIG. 8 implements the Liquid Crystal screen LCS combination of FIG. 6 by incorporating the liquid crystal material in a lamina or substrate in the form of a film F protectively laminated between a transparent supporting front substrate S and the mirror lamina M. Accordingly, an ENCAP or Polymer Dispersed Liquid Crystal (PDLC) is employed wherein the liquid crystal material is contained in the form of minuscule droplets or cells embedded in a polymer matrix (see FIGS. 14 and 15). In accordance with this front projection system, the mirror M faces forwardly and is positioned with its reflective surface contiguous to the back face of the nematic film F, whereby the image is reflected and refraction compounded thereby double the degree of light scatter effect. A characteristic feature of the PDLC is the encapsulation of the liquid crystal droplets or cells within the semi-solid matrix.

Figure 9:
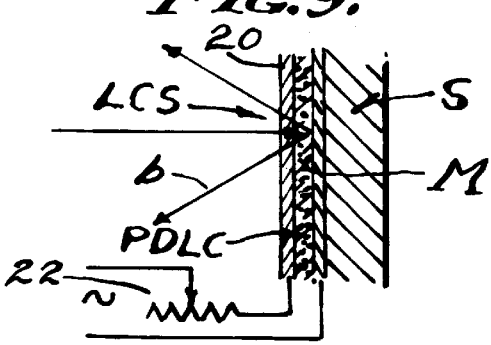

FIG. 9 implements the liquid Crystal Screen LCS and mirror M combination of FIG. 6 by supporting the nematic liquid crystal material at the front of the substrate S, and electrically controlling the transparency of the liquid crystal film F. A hereinabove described with reference to the FIG. 3 embodiment, an ENCAP or Polymer Dispersed Liquid Crystal (PDLC) film F is employed for containment of the liquid crystal droplets or cells within a transparent material and preferably such as a clear polymer ie. Milar. And, in accordance with this invention a magnetic or electric field is applied between the front and back faces of the liquid crystal film F coextensively thereof for controlled dipole alignment of the crystal molecules. In this embodiment, an electrically conductive transparent lamina 20 of Indium Tin Oxide or the like is in contiguous surface contact with the front face of the liquid crystal film F, and an electrically conductive reflective face of mirror M is in contiguous surface contact with the back face of the liquid crystal film F. Negative and positive variable field potential is applied through a potentiometer 22 for applying voltage up to and through an operational threshold in order to vary translucency of the film F.

As hereinabove described, in the case of parallel alignment of nematic liquid crystal, two points occur where the director is undefined (disclinations), while in the case of perpendicular alignment only one disclination occurs. In parallel alignment when no electric field is applied, each droplet or cell is oriented with a line connecting the two disclinations and the molecules oriented at random. And, light passing. through the ENCAP or PDLC film has its electric field oriented parallel to the opposite faces of the film, so it must interact with the droplets or cells oriented with the director parallel to the electric field, perpendicular to the electric field and to every angle thereof between. Again, it is impossible for the indices of refraction to be equal, so that the difference of indices causes reflections from the droplets or cells. As a result, a PDLC with no electric field applied scatters light intensely.

As hereinabove described, when an electric field is increasingly applied as shown in FIG. 9, the liquid crystal molecules increasingly align with the director disposition in each droplet or cell thereby connecting the two disclination lines parallel to the electrical field substantially perpendicular to the director (see FIG. 15), so that refraction is comensurately reduced and the ENCAP or PDLC film F appears less translucent, as the degree of field potential is applied. The degree of liquid crystal transparency is thereby controlled by the application of electrical potential applied between the conductive lamina 20 and mirror lamina M, and in alignment to the front and back faces of the film F. In this embodiment the back substrate S is preferably a thick supporting lamina that can be opaque, and the reflector M lamina is contiguously laminated thereto and directly to the back face of the nematic film F, the aluminized mirror being electrically conductive.

In accordance with this front projection system, the reflector M faces forwardly and is positioned with its reflective surface contiguous to the back face of the nematic film F. Therefore, projected light comprised of the image to be front viewed is transmitted rearwardly through the single transparent electrically conductive lamina 20 and the nematic film lamina F, and is then reflected and transmitted forwardly through the film lamina F to emanate from lamina 20 whereby refraction is compounded so as to double the degree of light scatter increasing diffusion of light and its angular spread as indicated by the arrows b. A characteristic feature of the PDLC is the encapsulation of liquid crystal droplets or cells within the solid matrix material.

Figure 10:
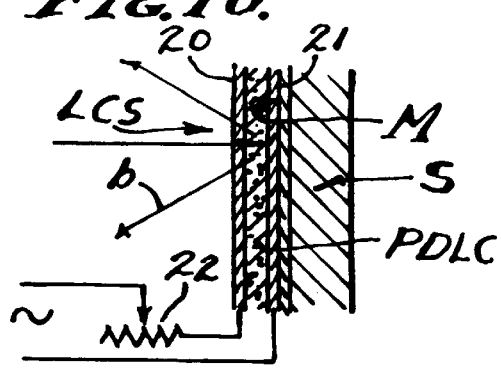

FIG. 10 implements the Liquid Crystal Screen LCS and mirror M combination of FIG. 6 by electrically controlling the translucency of the liquid crystal film F. As hereinabove described with reference to the FIG. 3 embodiment, an ENCAP or Polymer Dispersed Liquid Crystal (PDLC) is employed for containment of the liquid crystal droplets or cells, and preferably such as a clear polymer ie, Milar. And as hereinabove described with reference to the FIG. 4 embodiment, a magnetic or electric field is applied between the front and back faces of the liquid crystal film F coextensively thereof for controlled dipole alignment of the crystal molecules. In this embodiment electrically conductive transparent lamina 20 and 21 of Indium Tin Oxide or the like are in coextensive surface contact with the front and back faces of the liquid crystal film F, respectively, and a front face of the mirror limaina M is in contiguous engagement with the back face of the laimina 21. Negative and positive variable field potential is applied through a potentiometer 22 for applying voltage up to and through an operational threshold in order to vary translucency of the film F.

In this embodiment the back substrate S is preferably a thick supporting lamina that can be opaque, and the mirror M lamina is contiguously laminated thereto and to the back face of the electrically conductive transparent lamina 21. Therefore, projected light comprised of the image to be front viewed is transmitted both rearwardly and forwardly through the transparent electrically conductive laminae 20 and 21 and refraction compounded so as to double the degree of light scatter effect, thereby increasing diffusion of light and its angular spread as indicated by the arrows b.

Figure 11:
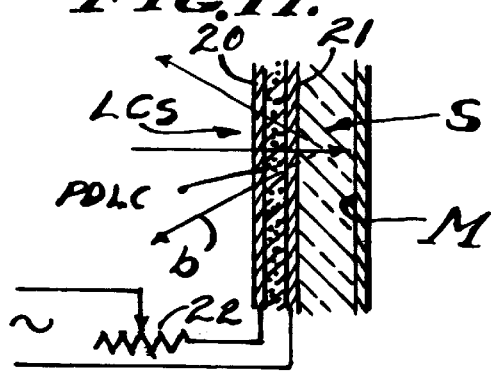

FIG. 11 implements the Liquid Crystal Screen LCS of FIG. 6 by electrically controlling the translucency of the liquid crystal film F. As hereinabove described with reference to the FIG. 8 embodiment, an ENCAP or Polymer Dispersed Liquid Crystal (PDLC) substrate-of clear polymer such as Milar is employed here for containment of the liquid crystal droplets or cells. And as hereinabove described with reference to the FIG. 9 and 10 embodiments, a magnetic or electric field is applied between the front and back faces of the ENCAP or PDLC substrate by electrically conductive transparent lamina 20 and 21 of Indium Tin Oxide or the like in contiguous surface contact with the front and back faces of the film F, respectively. And a variable field potential is applied through a potentiometer 22 as shown, for applying voltage up to and through an operational threshold in order to vary translucency of the film F.

In this embodiment the back substrate S is a thick clear supporting lamina that is highly transparent, and the mirror lamina M is contiguously laminated to the back face thereof in order to efficiently reflect the projected image. Therefore, projected light comprised of the image to be front viewed is transmitted both rearwardly and forwardly through the transparent electrically conductive laminae 20 and 21 and refraction compounded within the ENCAP or PDLC substrate so as to double the degree of light scatter effect, thereby increasing diffusion of light and its angular spread as indicated by the arrows b.

Referring now to FIG. 12 an LCS screen concept is disclosed, embodied in an optically coupled multi-panel system. As shown, there are three projectors P1, P2 and P3 for rear projection or for front projection as may be desired. Each projector has an optical axis X1, X2 and X3 respectively, and has a rectangular image format coinciding with the rectangular configuration of LCS panels Y1, Y2 and Y3 respectively. It will be observed that the adjacent marginal areas of the projected images can and do overlap, thereby establishing a double intensity image effect along said overlapped margins. In accordance with this invention, said adjacent marginal areas are comprised of separate, vertically disposed, screen panels LCS1 and LCS2. All of said LCS screens as shown are constructed alike as hereinabove described for either rear or front projection and separated, as by a dielectric insulation 25 between the abutted edges thereof.

In accordance with this invention, and particularly with respect to the theater concept herein disclosed, reference is made to FIGS. 6–11, the LCS being darkened with a dichroic dye or the like in order to intensify the "black" and/or dark shades of a colored image. In practice, a grey or black dye is employed so as to accent the absence of projected light, to be distinguished from the prior art reflective white, beaded or silver screen. And, any ambient or stray light is absorbed by the dark LCS screen, whereby little or no light is viewed therefrom. However, the density of the dye, in the polymer substrate of liquid crystal film F is such as to be partially light transmissive, for example 50% light transmissive. Accordingly, that portion of the light passing through the liquid crystal substrate is refracted and then reflected by the mirror M, and again refracted before its emission as scattered light for front viewing a cinema or video screen. It is to be understood that the "black" density of the liquid crystal substrate can in practice graduate into "grey" and thereby increase the penetration and recentage portion of reflected light. It is also to be understood that either (rear or front projection) system is to be used with or without electrical gain control as hereinabove described, the LCS1 and LCS2 panels being addressed as shown in FIG. 13.

Referring again to FIG. 12, the multi-axes or any one projector axis can be provided with a spacial light modulator Z1, Z2 or Z3. Each of said modulators is an LCS or PDLC panel as hereinabove described with reference to FIGS. 1–5, namely for rear projection (devoid of the mirror M). In practice, the spacial light modulator panels are of a configuration to intercept the column of projected light at a position along the projection axis X1, X2 or X3 for modifying the image and/or controlling its brightness in selected areas or coextensively thereof as may be required. As shown, each modulator Z1, Z2 and Z3 is in a plane perpendicular to axes X1, X2 and X3 respectively. And each modulator LCS or PDLC screen is addressed with a variable electrical potential (see FIGS. 12 and 13).

Figure 14:
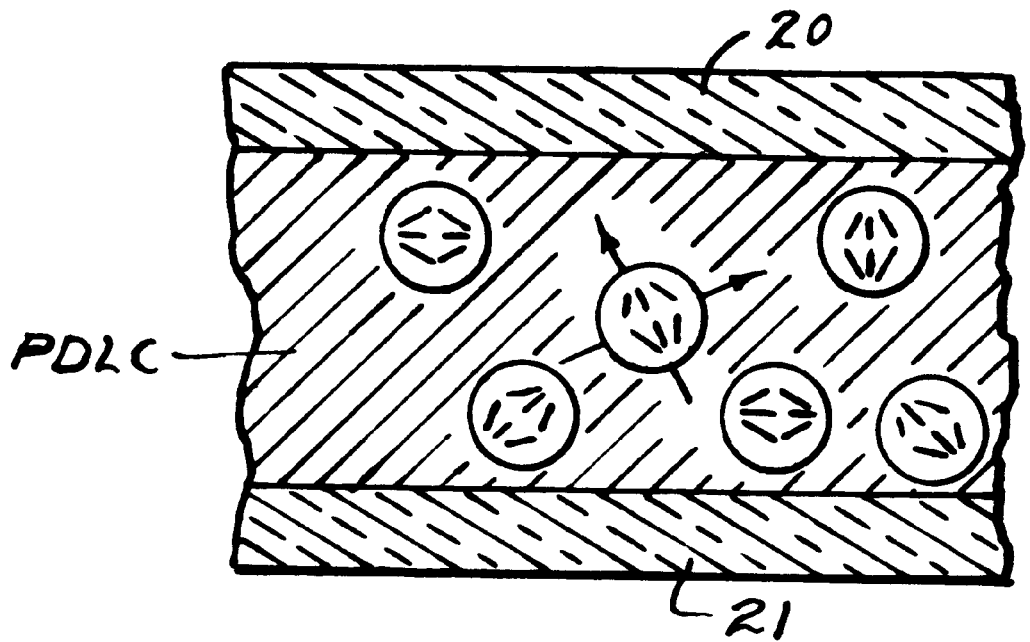
FIGS. 14 and 15 are enlarged detailed sectional views illustrating the light controlling conditions of nematic liquid crystal.
Figure 15:
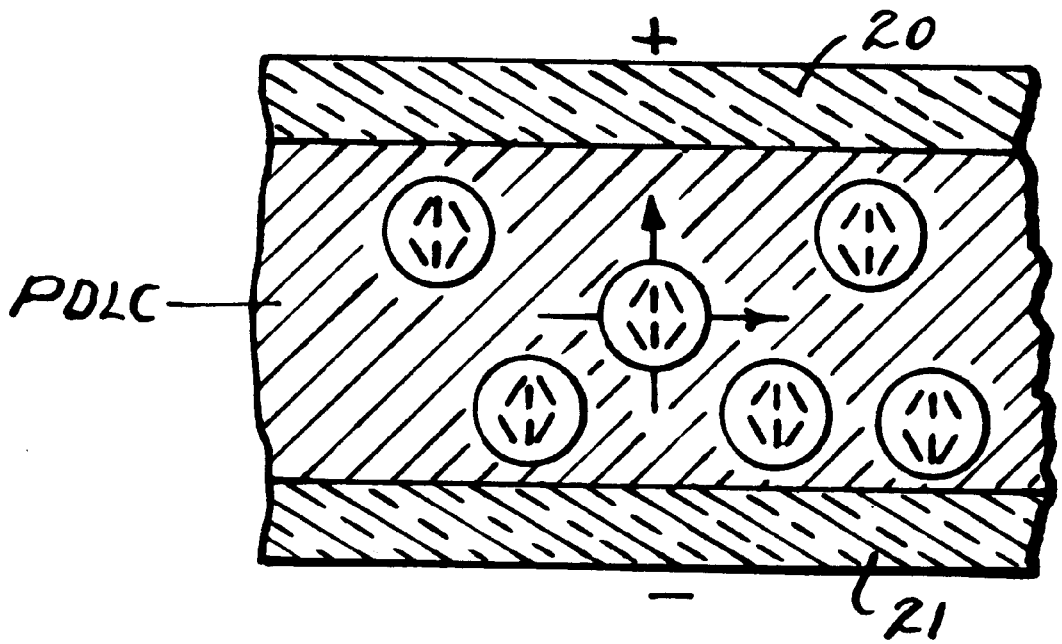

Referring now to FIGS. 14 and 15 of the drawings, an ENCAP or Polymer Dispersed Liquid Crystal (PDLC) is shown as a film laminated between opposed transparent electrically conductive substrates 20 and 21, all as hereinabove described (see FIGS. 4, 5, 9, 10 and 11). The liquid crystal material is represented as tiny droplets or cells embedded or encapsulated in a solid polymer matrix, and an ENCAP or PDLC film F results. These films normally scatter light extremely efficiently, because the molecule director within each cell adopts one of two configurations, depending upon whether the liquid crystal prefers to align parallel or perpendicular to the opposite polymer surfaces. In parallel alignment the director is undefined and many disclinations of the molecules occur, while in perpendicular alignment there is only one disclination at the center of each cell (see FIG. 15). If no electric field is applied, many disclinations occur in the cells with the molecules oriented completely at random (see FIG. 14). However, when an electric field is applied through the PDLC (face to face) then the liquid crystal molecules prefer to align parallel to said field and with the director in each cell (see FIG. 15). Light passes through the cell with its electric field perpendicular to the director, and with the indices of refraction equal to the polymer material, and little or no refraction occurs rendering the LC material clear and transparent. There are two major advantages; first, no polarizers are required and the light transmission is efficient; and second, thickness of the substrate is not critical. Another advantage heretofore thought as a disadvantage is that the voltage threshold curve is not sharp and conversely is widened, thereby enabling a high degree of infinitely variable control over light transmission between opaque and transparent (translucency).

For the purpose of having a combined large projection LCS screen and decorator friendly and conventional mirror M, a substrate is laminated directly onto a structural glass substrate in the form of a conventional mirror (see FIGS. 7 and 8). In an unelectrified light transmitting mode the ENCAP or PDLC implements the normal mirror function. However, by electrifying the conductive transparent substrates with a controlled voltage the liquid crystal substrate becomes more translucent so that an image projector on the optical axis of the mirror produces a video (cinema) image upon the LCS screen, with controlled light scatter (see FIGS. 9, 10 and 11).

The ENCAP or PDLC material is employed with or without a guest host dye as a contrasting agent. The liquid crystal droplets or cells encapsulated within a gel or solid matrix or the like, simulating "Swiss cheese". The cells are but a few microns in diameter for practical application here for the unique behavior required. The basic principle of the liquid crystal is in its excellent light scattering properties, preferably when in an unenergized state, and the ability of its nematic director to align with an electrical field. Typically, the ENCAP or PDLC film is approximately 25 to 50 microns thick and confined between very thin laminae of transparent conductive material, preferably Indium Tin Oxide.

Deposition of liquid crystal material is done through conventional techniques such as the use of slot-dye coating or spraying as done in powder-coating. However, the preferred process is the embodiment of acrylic sheeting or a flexible polyester substrate such as Mylar. And in practice, a protective film is applied over the PDLC to protect it, or by applying a hardening agent or laminate thereto, preferably an ant-glare coating that diminishes spectral reflections.

The term "Liquid Crystal" in the context of the present invention refers generally to all types thereof having the properties of the preferred nematic type or those exhibiting dielectric anisotropy. Such materials normally contain foreign materials dissolved therein, including pleochroic or dichroic dye, or small amounts of the synthetic resins from which the ENCAP or PDLC was phase separated The droplet or cell size and shape and density are key factors in determining light scatter and diffusion characteristics. The cell size affects screen color, contrast, brightness and forward light scatter. Cell size varies from 0.5 to 3 microns in order to provide acceptable light scatter and wide angle viewing. If the cells are too small the performance is adversely affected, i.e. adverse to color, contrast, brightness and scatter. Also, as LC thickness increases, so does the back scatter of light.

Figure 16:
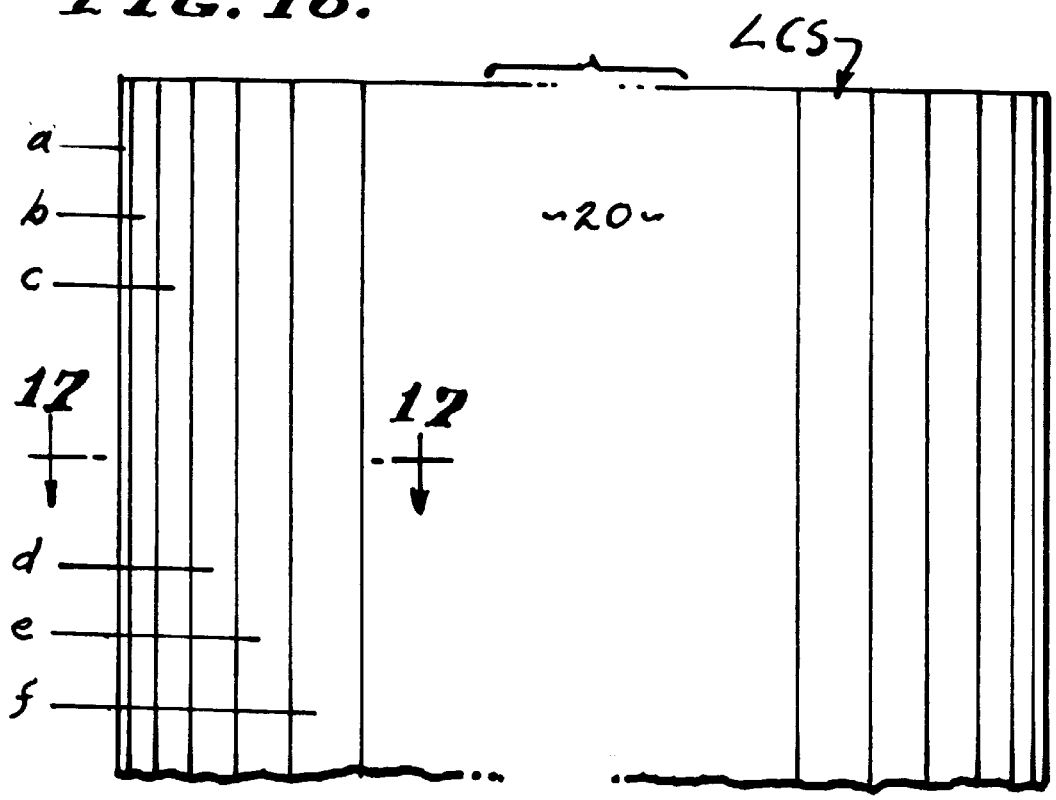
FIG. 16 is a front view of an LCS screen having individually addressed marginal LCS strips.
Figure 17:
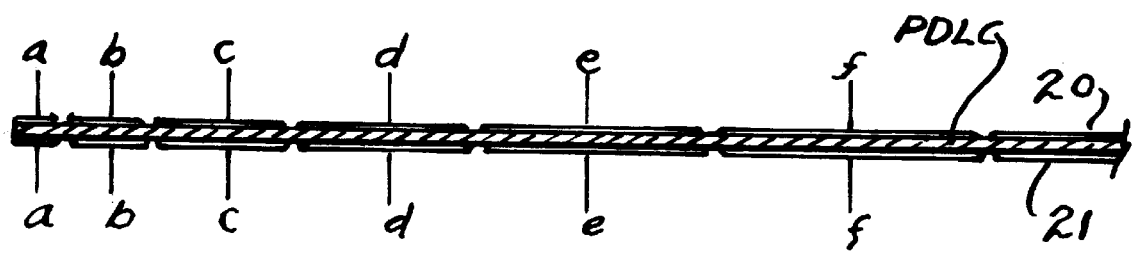
FIG. 17 is an enlarged sectional view taken as indicated by line 17—17 on FIG. 16.

Referring now to FIGS. 16 and 17, the PDLC substrate S is electrically energized by front and back laminae 20 and 21 and by separate adjacently isolated laminae 20a–f, and 21a–f. The process of separating these narrower bands or strips of Indium Tin Oxide can vary, however a simple method is to scribe the thin lamina thereof with a sharp tool thereby cutting them apart leaving the substrate undisturbed. As shown, these strips are parallel and of diminished width toward the sides of the screen. However, the number of, size and shape of these areas can be as circumstances require.

In accordance with this invention, the field polarity applied to the areas of liquid crystal is interrupted synchronously with the shutter speed of cinema projection, and synchronously with the image cycle of video projection. Accordingly, an interrupting or reversing field generator means (not shown) is provided for generating a pulse voltage or square or sign wave voltage potential as shown throughout the drawings. Thus, the liquid crystal control is brought into alignment and compatible with each individual image projected onto the LCS screen.

Referring now to FIGS. 18 through 21 it is a primary object of this invention to provide a cost effective image projecting screen having improved characteristics. The adverse effect of ambient light is substantially reduced, the transmission and reflection of light is more efficient, wide angle viewing is improved, dark to light contrast and color differentiation is achieved together with high resolution. And, the "light gain" can be as much or more than 80%, whereas state of the art light gain is 30% more or less.

However, commercial liquid crystal films, substrates and lamina as employed herein are available in lengthy rolls but generally of limited width. And heretofore, the lines of joinder where adjacent panels of film, substrate and lamina abut have been noticeable when viewing the screen. Accordingly, an optical splice is provided herein for obscuring said lines of joinder, so that they are not visible to the viewer. In practice, there are two basic optical splices to be considered, a film lamina splice as shown in FIGS. 18 and 19, and a laminate splice as shown in FIGS. 20 and 21.

Referring now to the film lamina splice of FIGS. 18 and 19, a first panel of film lamina F liquid crystal material in the ENCAP or PDLC form (see FIG. 3 and FIGS. 2, 4–11) is supported upon a table T. The characteristic physical property of the film F is that it is soft and plastic and therefore easily cut and formed by using a sharp knife or roller cutter and forming tool. In FIG. 18 there is shown a planar table T upon which the panel of film lamina F is disposed and against which a knife and forming tool C is pressed at a normal perpendicular angle when moved in the direction of the arrow in FIG. 18. In practice, the forming sides of the tool C are angularly divergent from the cutting edge, for example at an included angle of 22½° to 45° as shown, so as to form the plastic edges of the cut lamina. Note that the top side 1 of the film lamina is formed laterally whereas the bottom side 2 is not moved, and that the flat inclined side of the tool C forms an inclined chamfer 3 along the edge of the panel. A narrow margin 5 is separated and expendable. As a result, an optical splice or scarf is formed when a second film lamina panel is cut and formed in the identical manner with an inclined chamfer 4 and that second panel turned over and mated with the first panel as shown in FIG. 19. As shown, there are chamfers 3 and 4 that mate diagonally to form the optical splice or scarf, whereby the joinder of the two panels of film lamina is imperceptible at a normal viewing distance.

Referring now to the laminate splice of FIGS. 20 and 21, the film lamina F is disposed between top and bottom transparent electrically conductive lamina 20 and 21, it being understood that the film lamina F can be laminated as shown in any one of FIGS. 2–5 and 7–11. The splice or scarf of FIGS. 20 and 21 differs from that of FIGS. 18 and 19 only in the characteristic firmness of the structured laminates which are cut by a shearing cutter C1, and not formed thereby. Accordingly, the scarf angle is established by the angular disposition of the shearing cutter C1 as shown at approximately 22½° to 45° and moved in the direction of the arrow in FIG. 20. As shown, there are chamfers 3 and 4 that mate diagonally to form the optical spice or scarf, whereby the joinder of the two panels of film and associated lamina is imperceptible at a normal viewing distance.

The joinder of adjacent LCS screen panels is completed with the application of a transparent adhesive at the interfaces 3 and 4, or preferably with the application of transparent pressure sensitive tape 6 applied as shown over and to connect and seal the optical splice or scarf.

It is to be understood that the aforesaid nematic liquid crystal that is changeable from opaque to clear, can also be employed in a reverse mode so as to be changeable from clear to opaque, or to any degree of translucency as may be required. The containment of the liquid crystal can be in a gel rather than a solid matrix. And, liquid crystal materials such as cholosterics, or crystal materials in solution can also be vacuum pumped into a cell, and all of which can be electrically modulated as herein described.

Having described only the preferred forms and applications of my invention, I do not wish to be limited or restricted to the specific details herein set forth, but wish to reserve to myself any modifications or variations that may appear to those skilled in the art as set forth within the limits of the following claims.

I claim:

1. A light scattering high-gain screen for viewing an image focused thereon from a light projector means, and including;
    a film adapted to be placed in the focal plane of a projected image and comprised of a lamina of liquid crystal material coextensively applied therethrough and scattering the projected light by means of refraction to emanate angularly from the screen for viewing,
    wherein the liquid crystal material contains -a darkening dye obstructing a portion of the light passing therethrough.

2. The screen for viewing an image as set forth in claim 1, wherein the lamina material is a nematic liquid crystal.

3. The screen for viewing an image as set forth in claim 1, wherein the darkening dye comprises grey dye obstructing a determined portion of the projected light passing therethrough, and thereby partially non-reflective to ambient light.

4. The screen for viewing an image as set forth in claim 1, wherein the darkening dye comprises black dye obstructing a determined portion of the projected light passing therethrough to reduce reflection of ambient light.

5. The screen for viewing an image as set forth in claim 1, wherein the substrate is an Encapsulated Liquid Crystal (ENCAP) incorporating the lamina of liquid crystal material.

6. The screen for viewing an image as set forth in claim 1, wherein the laminae of liquid crystal material is disposed between light transmitting electrically conductive lamina and one of which is laminated to a supporting substrate, there being electrical control means for applying a field voltage to said electrically conductive laminae, and thereby adjusting the light transmitting alignment of the liquid crystal molecules.

7. The screen for viewing an image as set forth in claim 6, wherein the light transmitting electrically conductive laminae are of Indium Tin Oxide.

8. The screen for viewing an image as set forth in claim 1, wherein the film lamina is an Encapsulated Liquid Crystal (ENCAP) incorporating the lamina of liquid crystal material, and wherein said substrate is disposed between light transmitting electrically conductive laminae, there being electrical control means for applying a field voltage to said electrically conductive laminae, and thereby adjusting the light transmitting alignment-of the liquid crystal molecules.

9. The screen for viewing an image as set forth in claim 8, wherein the light transmitting electrically conductive laminae are of Indium Tin Oxide.

10. A light scattering high-gain screen for viewing an image focused thereon from a light projector means, and including;
    a film adapted to be placed in the focal plane of a projected image and comprised of a lamina of liquid crystal material coextensively applied therethrough and scattering the projected light by means of refraction to emanate angularly from the screen for viewing,
    wherein the laminae of liquid crystal material is disposed between light transmitting electrically conductive lamina and one of which is laminated to a supporting substrate, there being electrical control means for applying a field voltage to said electrically conductive laminae, and thereby adjusting the light transmitting alignment of the liquid crystal molecules,
    there being means for interrupting polarity of said field voltage synchronously with projection of the light image through the liquid crystal material.

11. A light scattering high-gain screen for viewing an image focused thereon from a light projector means, and including;
   a film adapted to be placed in the focal plane of a projected image and comprised of a lamina of liquid crystal material coextensively applied therethrough and scattering the projected light by means of refraction to emanate angularly from the screen for viewing,
   wherein the film lamina is an Encapsulated Liquid Crystal (ENCAP) incorporating the lamina of liquid crystal material, and wherein said substrate is disposed between light transmitting electrically conductive laminae, there being electrical control means for applying a field voltage to said electrically conductive laminae, and thereby adjusting the light transmitting alignment of the liquid crystal molecules,
   there being means for interrupting polarity of said field voltage synchronously with projection of the light image through the liquid crystal material.

12. A light scattering high gain screen for viewing a rear projection image focused thereon from a light projector means, and including;
   a transparent substrate adapted to be placed in the plane of a projected image whereby the image is projected on the back of the transparent substrate, and a film lamina of liquid crystal material coextensively applied to said substrate and scattering the projected light passing therethrough by means of refraction to emanate forwardly and angularly from the screen for viewing, and
   wherein the liquid crystal material contains a darkening dye obstructing a portion of the light passing there through.

13. The screen for viewing a rear projection image as set forth in claim 12 wherein the film lamina material is a nematic liquid crystal.

14. The screen for viewing a rear projection image as set forth in claim 12, wherein the darkening dye comprises grey dye obstructing a determined portion of the projected light passing therethrough, and thereby partially non-reflective to ambient light.

15. The screen for viewing a rear projection image as set forth in claim 12, wherein the darkening dye comprises black dye obstructing a determined portion of the projected light passing therethrough, and thereby substantially non-reflective to ambient light.

16. The screen for viewing a rear projection image as set forth in claim 12, wherein the transparent substrate is an Encapsulated Liquid Crystal (ENCAP) incorporating the film lamina.

17. The screen for view a rear projection image as set forth in claim 12, wherein the film lamina of liquid crystal material is disposed between light transmitting electrically conductive laminae and one of which is laminated to a supporting substrate, there being electrical control means for applying a field voltage to said electrically conductive laminae, and thereby adjusting the light transmitting alignment of the liquid crystal molecules.

18. The screen for viewing a rear projection image as set forth in claim 17, wherein the light transmitting electrically conductive lamina are of Indium Tin Oxide.

19. The screen for viewing a rear projection image as set forth in claim 12, wherein the transparent substrate is an Encapsulated Liquid Crystal (ENCAP) incorporating the film lamina of liquid crystal material, and wherein said substrate is disposed between light transmitting electrically conductive lamina, there being electrical control means for applying a field voltage to said electrically conductive laminae, and thereby adjusting the light transmitting alignment of the liquid crystal molecules.

20. The screen for viewing a rear projection image as set forth in claim 19, wherein the light transmitting electrically conductive laminae are of Indium Tin Oxide.

21. A light scattering high gain screen for viewing a rear projection image focused thereon from a light projector means, and including;
   a transparent substrate adapted to be placed in the plane of a projected image whereby the image is projected on the back of the transparent substrate, and a film lamina of liquid crystal material coextensively applied to said substrate and scattering the projected light passing therethrough by means of refraction to emanate forwardly and angularly from the screen for viewing,
   wherein the transparent substrate is an Encapsulated Liquid Crystal (ENCAP) incorporating the film lamina of liquid crystal material, and wherein said substrate is disposed between light transmitting electrically conductive lamina, there being electrical control means for applying a field voltage to said electrically conductive laminae, and thereby adjusting the light transmitting alignment of the liquid crystal molecules,
   there being means for interrupting polarity of said field voltage synchronously with projection of the light image through the liquid crystal material.

22. A light scattering high gain screen for viewing a rear projection image focused thereon from a light projector means, and including;
   a transparent substrate adapted to be placed in the plane of a projected image whereby the image is projected on the back of the transparent substrate, and a film lamina of liquid crystal material coextensively applied to said substrate and scattering the projected light passing therethrough by means of refraction to emanate forwardly and angularly from the screen for viewing,
   wherein the film lamina of liquid crystal material is disposed between light transmitting electrically conductive laminae and one of which is laminated to a supporting substrate, there being electrical control means for applying a field voltage to said electrically conductive laminae, and thereby adjusting the light transmitting alignment of the liquid crystal molecules,
   there being means for interrupting polarity of said field voltage synchronously with projection of the light image through the liquid crystal material.

23. A light scattering high gain screen for viewing a front projection image focused thereon from a light projector means, and including;
   A supported film lamina of liquid crystal material adapted to be placed in the front focal plane of a projected image, and a forwardly faced reflector lamina at the back of the film lamina of liquid crystal material and reflecting light forwardly, the projected light being scattered by means of refraction when passing both rearwardly and forwardly to emanate forwardly and angularly from the screen for front viewing,
   wherein the liquid crystal material contains a darkening dye obstructing a portion of the light passing there through.

24. The screen for viewing a front projection image as set forth in claim 23, wherein the liquid crystal material is a nematic liquid crystal.

25. The screen for viewing a front projection image as set forth in claim 23, wherein the darkening dye comprises grey dye obstructing a determined portion of the projected light passing therethrough, and thereby partially non-reflective to ambient light.

26. The screen for viewing a front projection image as set forth in claim 23, wherein the darkening dye comprises black dye obstructing a determined portion of the projected light passing therethrough, and thereby substantially non-reflective to ambient light.

27. The screen for viewing a front projection image as set forth in claim 23, wherein the supported film lamina of liquid crystal material is a contained transparent Polymer Dispersed Liquid Crystal (PDLC) substrate.

28. The screen for viewing a front projection image as set forth in claim 27, there being a supporting substrate at the back of the reflector lamina.

29. The screen for viewing a front projection image as set forth in claim 27, there being a transparent substrate at the front of the film lamina of liquid crystal material.

30. The screen for viewing a front projection image as set forth in claim 23, there being a supporting substrate at the back of the reflector lamina.

31. The screen for viewing a front projection image as set forth in claim 23, there being a front light transmitting electrically conductive lamina contiguous to the front of the liquid crystal film lamina, there being a back light transmitting electrically conductive lamina contiguous to the back of the liquid crystal film lamina, the reflector lamina being contiguous to the back of the last mentioned light transmitting electrically conductive laminae and there being electrical control means for applying a field voltage to said electrically conductive laminae, and thereby adjusting the light transmitting alignment of the liquid crystal molecules.

32. The screen for viewing a front projection image as set forth in claim 31, wherein the light transmitting electrically conductive laminae are of Indium Tin Oxide.

33. A light scattering high gain screen for viewing a front projection image focused thereon from a light projector means, and including;
   A supported film lamina of liquid crystal material adapted to be placed in the front focal plane of a projected image, and a forwardly faced reflector lamina at the back of the film lamina of liquid crystal material and reflecting light forwardly, the projected light being scattered by means of refraction when passing both rearwardly and forwardly to emanate forwardly and angularly from the screen for front viewing,
   the reflector lamina being an electrically conductive first surface reflector contiguous to the back of the liquid crystal film lamina, there being a light transmitting electrically conductive lamina contiguous to the front of the liquid crystal film lamina, and there being electrical control means for applying a field voltage to said electrically conductive laminae, and thereby adjusting the light transmitting alignment of the liquid crystal molecules.

34. The screen for viewing a front projection image as set forth in claim 33, wherein the reflector lamina is metallic and the light transmitting electrically conductive lamina is of Indium Tin Oxide.

35. The screen for viewing front projection image as set forth in claim 33, there being means for interrupting polarity of said field voltage synchronously with projection of the light image through the liquid crystal material.

36. A light scattering high gain screen for viewing a front projection image focused thereon from a light projector means, and including;
   A supported film lamina of liquid crystal material adapted to be placed in the front focal plane of a projected image, and a forwardly faced reflector lamina at the back of the film lamina of liquid crystal material and reflecting light forwardly, the projected light being scattered by means of refraction when passing both rearwardly and forwardly to emanate forwardly and angularly from the screen for front viewing,
   there being a front light transmitting electrically conductive lamina contiguous to the front of the liquid crystal film lamina, there being a back light transmitting electrically conductive lamina contiguous to the back of the liquid crystal film lamina, the reflector lamina being contiguous to the back of the last mentioned light transmitting electrically conductive laminae and there being electrical control means for applying a field voltage to said electrically conductive laminae, and thereby adjusting the light transmitting alignment of the liquid crystal molecules,
   there being means for interrupting polarity of said field voltage synchronously with projection of the light image through the liquid crystal material.

37. A light scattering high gain screen for viewing a front projection image focused thereon from a light projector means, and including;
   A supported film lamina of liquid crystal material adapted to be placed in the front focal plane of a projected image, and a forwardly faced reflector lamina at the back of the film lamina of liquid crystal material and reflecting light forwardly, the projected light being scattered by means of refraction when passing both rearwardly and forwardly to emanate forwardly and angularly from the screen for front viewing,
   there being a front light transmitting electrically conductive lamina contiguous to the front of the liquid crystal film lamina, there being a back light transmitting electrically conductive lamina contiguous to the back of the liquid crystal film lamina, there being a transparent supporting substrate contiguous to the back of the last mentioned light transmitting electrically conductive lamina, the reflector lamina being contiguous to the back of the supporting substrate, and there being electrical control means for applying a field voltage to said electrically conductive laminae, and thereby adjusting the light transmitting alignment of the liquid crystal molecules.

38. The screen for viewing a front projection image as set forth in claim 37, wherein the light transmitting electrically conductive laminae are of Indium Tin Oxide.

39. A light scattering high gain screen for viewing a front projection image focused thereon from a light projector means, and including;
   A supported film lamina of liquid crystal material adapted to be placed in the front focal plane of a projected image, and a forwardly faced reflector lamina at the back of the film lamina of liquid crystal material and reflecting light forwardly, the projected light being scattered by means of refraction when passing both rearwardly and forwardly to emanate forwardly and angularly from the screen for front viewing,
   there being a front light transmitting electrically conductive lamina contiguous to the front of the liquid crystal film lamina, there-being a back light transmitting electrically conductive lamina contiguous to the back of the liquid crystal film lamina, there being a transparent supporting substrate contiguous to the back of the last mentioned light transmitting electrically conductive lamina, the reflector lamina being contiguous to the back of the supporting substrate, and there being electrical control means for applying a field voltage to said electrically conductive laminae, and thereby adjusting the light transmitting alignment of the liquid crystal molecules, there being means for interrupting polarity of said field voltage synchronously with projection of the light image through the liquid crystal material.

40. An optically coupled projected image viewing system comprised of at least two separated light scattering high-gain screens for viewing complementary projected images focused thereon from separate light projector means, and a separate light scattering high-gain screen extending between said two separated screens, edges of respective pairs of relatively adjacent screens being closely juxtaposed, projected images from the projector means being overlapped a distance equal to the extent of said separate screens extending between said two separated screens, each of said screens including, a film lamina of liquid crystal material controlling passage of light therethrough and scattering the projected light by means of refraction to emanate angularly from the screens for viewing, the said separate screen restricting the passage of light commensurate with the increase thereof due to said projected image overlap.

41. The optically coupled projected image viewing system as set forth in claim 40, wherein the lamina of liquid crystal material of each of said screens is disposed between electrically conductive laminae, there being electrical control means for applying a field voltage to said electrically conductive laminae, and thereby adjusting the light transmitting alignment of the liquid crystal molecules.

42. The optically coupled projected image viewing system as set forth in claim 41, wherein the electrically conductive laminae are of Indium Tin Oxide.

43. The optically coupled projected image viewing system as set forth in claim 41, there being means for interrupting polarity of said field voltage synchronously with projection of the light image through the liquid crystal material.

* * * * *